US006078587A

United States Patent [19]

[11] Patent Number: 6,078,587
[45] Date of Patent: Jun. 20, 2000

Lynch et al.

[54] MECHANISM FOR COALESCING NON-CACHEABLE STORES

[75] Inventors: William L. Lynch, La Honda; Michael G. Lavelle, Saratoga, both of Calif.

[73] Assignee: Sun Microsystems, Inc., Palo Alto, Calif.

[21] Appl. No.: 08/880,469

[22] Filed: Jun. 23, 1997

[51] Int. Cl.[7] ............................ H04L 12/28; H04L 12/56

[52] U.S. Cl. ............................ 370/412

[58] Field of Search ............................ 370/394, 474, 370/473, 470, 471, 428, 429, 412, 413, 415

[56] References Cited

U.S. PATENT DOCUMENTS

| | | | |
|---|---|---|---|
| 5,784,649 | 7/1998 | Begur et al. | 395/872 |
| 5,818,456 | 10/1998 | Cosman et al. | 345/434 |

OTHER PUBLICATIONS

Ultra SPARC Programmer Reference Manual, UltraSPARC™–I User's Manual, Revision 1.0, SPARC Technology Business, 1995, p. 39. No Month.

*Primary Examiner*—Huy D. Vu
*Assistant Examiner*—Kevin C. Harper
*Attorney, Agent, or Firm*—Townsend and Townsend and Crew LLP

[57] ABSTRACT

Data is collected from multiple data packets for group transfer on a data path so as to maximize utilization of the data path. A particularly suitable data path is one that is coupled to transfer data to a graphics frame buffer. In collecting data from multiple data packets, data from individual packets are designated for loading onto the data path. In specific embodiments, data from a packet will be designated for loading onto the data path only if it is determined that the data is noncacheable data, the data would not overwrite other valid designated but not yet loaded data, or the resulting data to be transferred as a group would target data locations within a permissible locus of data locations, such as a contiguous range of addresses. The designated data are loaded onto the data path as a group for actual transfer. In a specific embodiment, there is a mask associated with each data packet that indicates which portions of each packet's possible data actually contain data to be transferred. In a specific embodiment, there is also a mask associated with each group transfer of data that indicates which portions of possible data in a group transfer actually contain data to be transferred.

6 Claims, 5 Drawing Sheets

MECHANISM FOR COALESCING NON-CACHEABLE STORES

BACKGROUND OF THE INVENTION

The present invention relates to transfer of data in a data processing environment. More particularly, the present invention relates to methods and systems for re-organizing data from a data stream so as to maximize the utilization of available data transfer bandwidth on a data pathway.

A data processing system typically includes fixed pathways for transferring data between elements within the system. These pathways typically have a maximum data path width, and a maximum frequency at which data may be placed onto the pathway. For example, a high-performance data bus pathway between a graphics controller and a graphics frame buffer may have a data path that is 128-bits wide onto which data may be placed during every cycle of a bus clock.

In order to maximize utilization of a communication pathway, the pathway's width should be filled as much as possible each time data is placed on the pathway. However, data to be transferred may have unit sizes which differ from the width of the pathway. For example, a graphics controller may process and seek to transfer data in, e.g., 24-bits- or 32-bits-wide units, whereas the data bus for transferring data may be 128-bits wide. In this situation, simply sending each unit of data by itself via the pathway would be wasteful of transfer bandwidth. What is needed is a scheme for transferring data that avoids such waste.

Such waste of transfer bandwidth is particularly undesirable in modern graphics subsystems because these subsystems need to transfer increasingly large amounts of video data from a graphics controller to a frame buffer due to an industry trend toward providing larger, higher-resolution, flicker-free video displays with increased color depth.

A rudimentary system exists for transferring data across a bus while avoiding such waste in certain circumstances. This rudimentary system exists within the graphics subsystem of UltraSPARC 1 workstations built by the assignees of the present invention. See, UltraSPARC 1 User's Manual, Sun Microsystems. The rudimentary system is severely limited because it can properly combine data from multiple requested data transfers only upon certain very precise conditions. If these conditions are not met, the rudimentary system may overwrite valid data as it tries to combine data from multiple packets.

What is needed are methods and systems for conserving data transfer bandwidth on a data pathway under a greater variety of conditions. What is also needed are methods and systems for conserving data transfer bandwidth that do not overwrite valid data.

SUMMARY OF THE INVENTION

The present invention collects data from multiple data packets for group transfer on a data path. In this way, utilization of the data path is increased. A data packet includes data and may include information about data location(s) targeted by the data. In a preferred embodiment, the data packets are requests to transfer graphics data via the data path to a graphics frame buffer.

In collecting data from multiple data packets, the present invention designates data from individual packets for loading onto the data path. The designated data are loaded onto the data path as a group for actual transfer. In a preferred embodiment, the designating of packets for loading is accomplished by placing the data into a transfer buffer.

In a specific embodiment, data from a packet will be designated for loading onto the data path only if it is determined that the data is noncacheable data.

In a specific embodiment, data from a packet will be designated for loading onto the data path only if the data would not overwrite other valid designated data in the transfer buffer.

In general, data to be transferred as a group on the data path must target data locations within a permissible locus of data locations. In a preferred embodiment, this locus of data locations corresponds to a contiguous range of addresses.

In a specific embodiment, there are a fixed number of bits of possible data associated with each packet, and a mask is associated with each data packet that indicates which portions of each packet's possible data actually contain data to be transferred.

In a specific embodiment, there is also a mask associated with each group transfer of data that indicates which portions of possible data in a group transfer actually contain data to be transferred.

A further understanding of the nature and advantages of the present invention may be realized by reference to the remaining portions of the specification and the drawings.

DESCRIPTION OF SPECIFIC EMBODIMENTS

Figure 1:
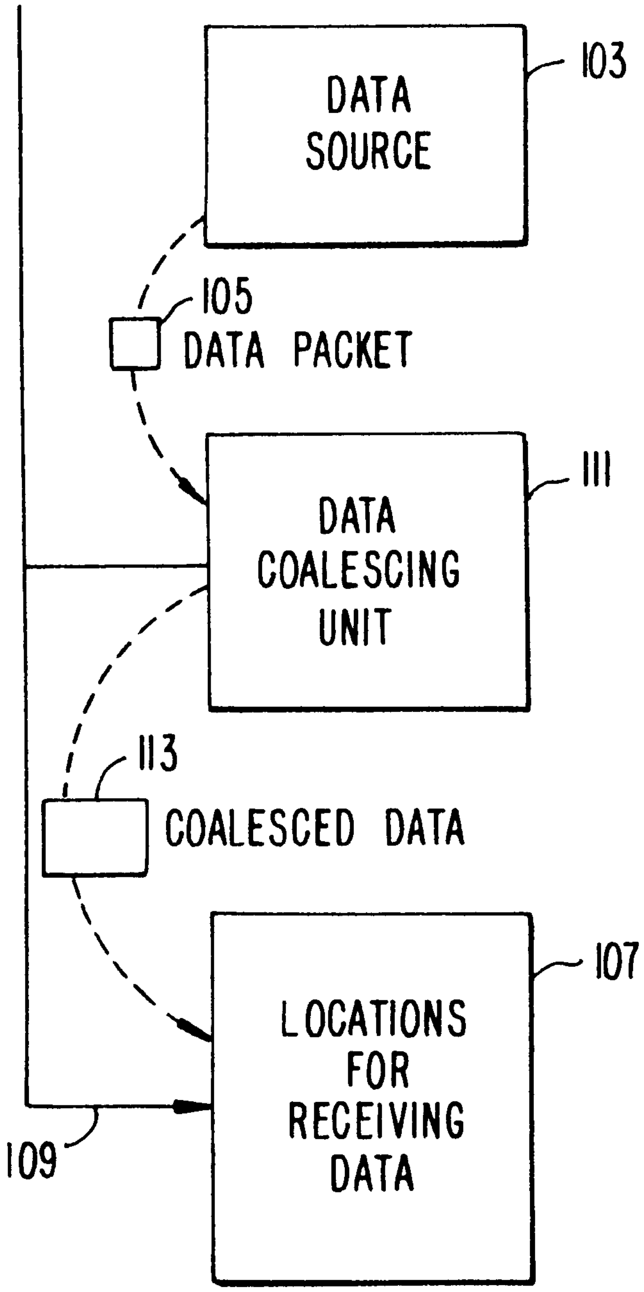
FIG. 1 is a schematic block diagram showing overall data flow in an embodiment of the present invention.

FIG. 1 is a schematic block diagram showing overall data flow according to one embodiment of the present invention. A data source 103 issues data packets 105 (including address and data), which data are to be transferred into data locations 107. A data path 109 exists for accessing the data locations 107. Rather than transfer the packets 105 individually to the data locations 107 along the data path 109, the present invention accepts the packets 105 in a data coalescing unit 111. The data coalescing unit 111 collects data from multiple packets 105 if possible, as will be described, and transfers these data as coalesced data 113 to the target data locations 107 via the data path 109.

Figure 2:
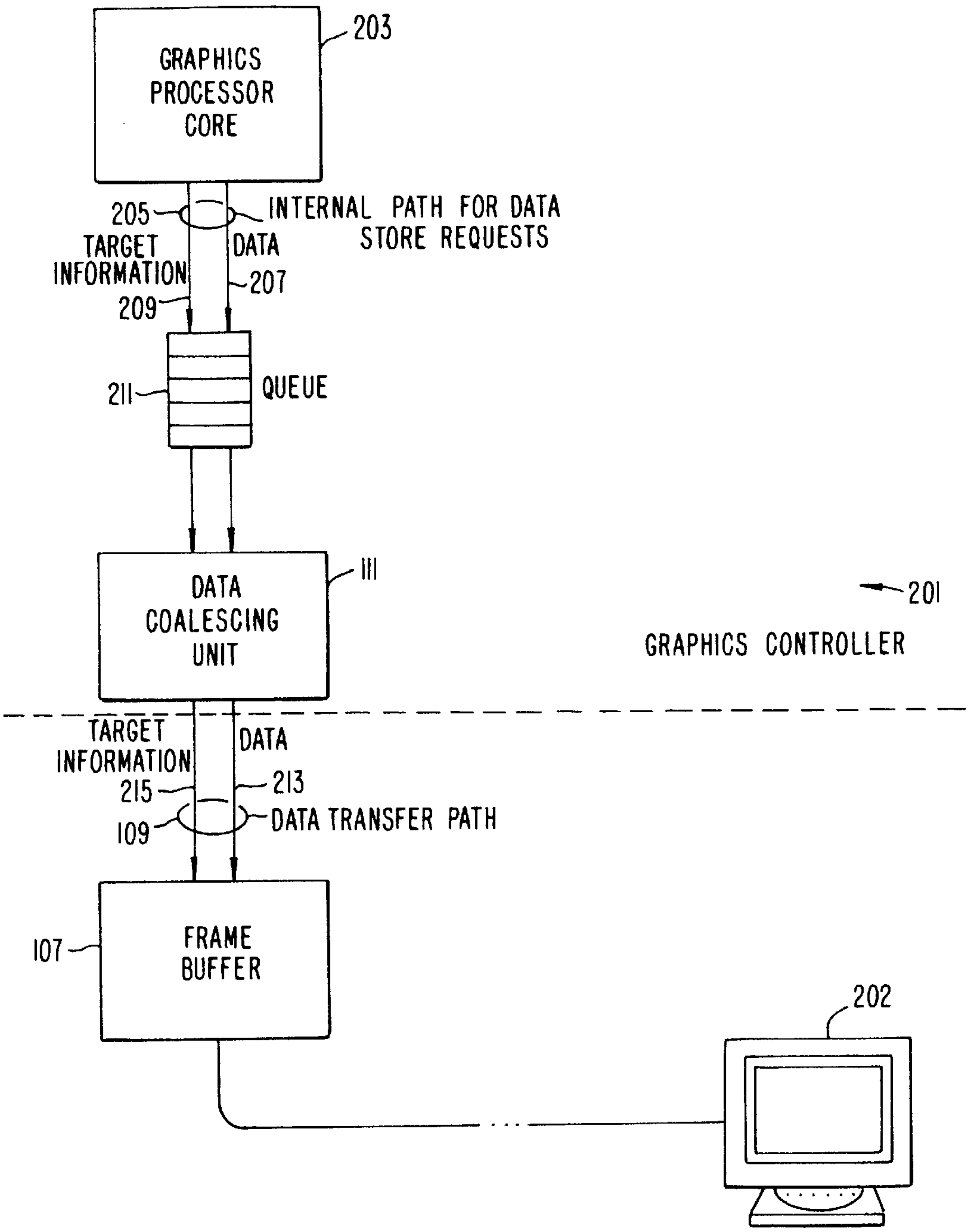
FIG. 2 is a schematic block diagram showing overall data flow in a graphics controller embodiment of the present invention.

FIG. 2 is a schematic block diagram showing overall data flow in graphics controller embodiment of the present invention. A graphics controller 201's function is to provide video data (e.g., color, intensity) to a frame buffer 107 for display on a video screen 202. The graphics controller 201 provides data in packets 105 (shown in FIG. 1) that each contain no more than M bits of data in this embodiment.

In the graphics controller 201, a graphics processor core 203 issues the data packets 105 onto an internal data path 205. The internal data path 205 has an M-bits wide path 207 for data and a path 209 for information about data location(s) targeted by the data. In a preferred embodiment of the present invention, the M-bits wide path 207 for data is a bus having M electrical signal carriers such that all data bits of each packet may be issued in a single clock cycle. Other internal data path organizations, including ones in which the paths 207 and 209 share physical lines, also remain within the scope of the present invention.

A queue 211 accepts the issued packets 105 for temporary storage. A data coalescing unit 111 removes packets from the queue 211 when the packets' data may be collected for transfer, as will be described. The data coalescing unit 111 transfers collected, or coalesced, data 113 (shown in FIG. 1) to the target frame buffer data locations 107 via the data path 109.

Data path 109 has an N-bits wide path 213 for the coalesced data and a path 215 for information about data location(s) targeted by the coalesced data 213. In a preferred embodiment of the present invention, the N-bits wide path 213 for data is a bus having N electrical signal carriers. Other data path organizations, including ones in which the paths 213 and 215 share physical lines, remain within the scope of the present invention.

Figure 3:
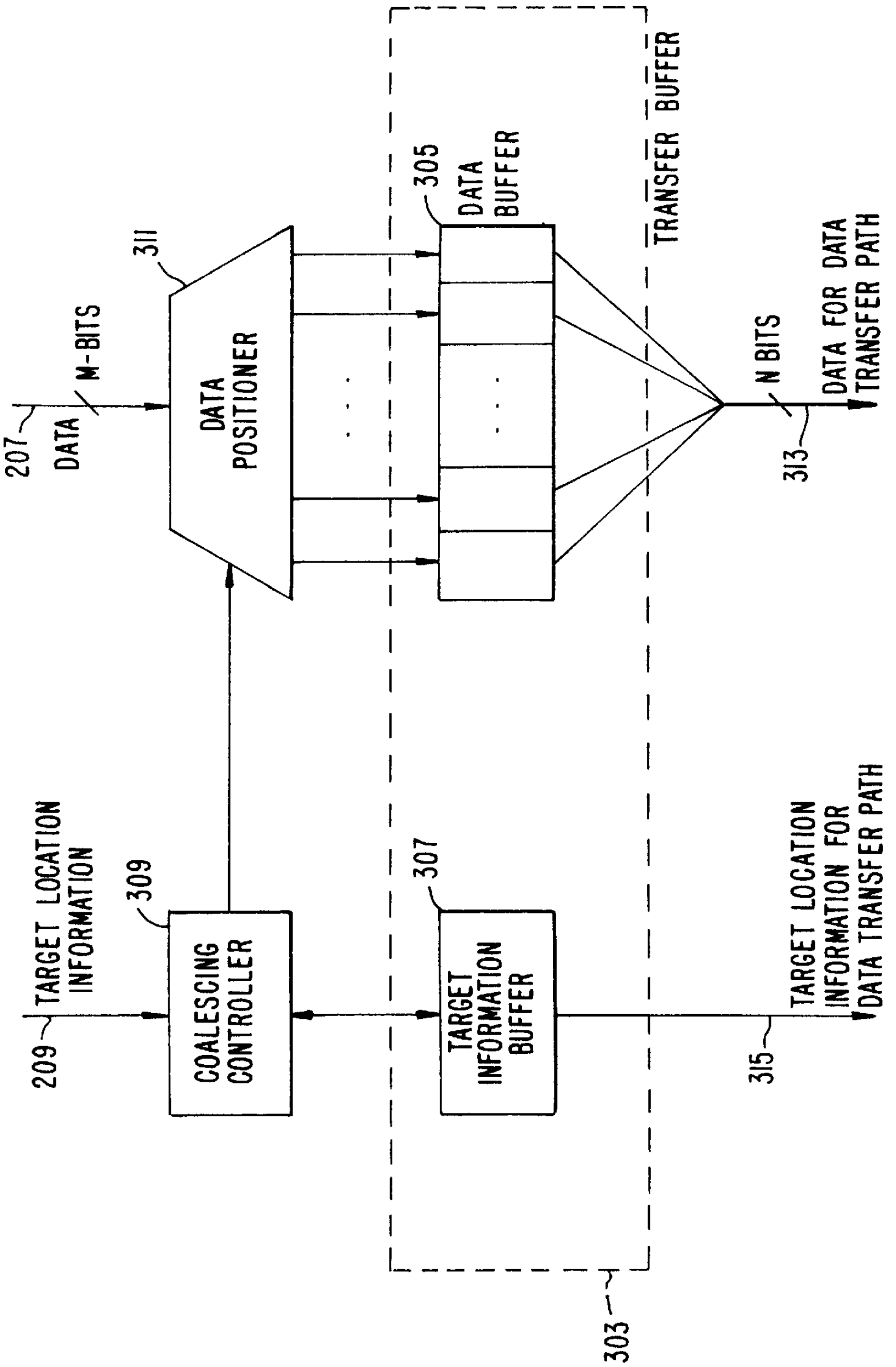
FIG. 3 is a schematic block diagram showing components within a data coalescing unit of FIG. 2 according to an embodiment of the present invention.

FIG. 3 is a schematic block diagram showing components within data coalescing unit 111 of FIG. 2. In this embodiment, the data coalescing unit includes a transfer buffer 303 which collects data for a subsequent transfer on the data transfer path 109.

The data transfer path 109 is configured to transfer up to N bits of data in each transfer. The data transfer path is configured to transfer information about targeted data locations according to some targeting scheme. The specifics of the targeting scheme limit the degree to which the data in a single transfer may target divergent data locations. For example, a targeting scheme in a specific embodiment that transfers only a single starting address and a scalar data length for each transfer would require that all data in a single transfer target a contiguous block of data locations.

Phrased another way, there is a data transfer requirement that all data in a given transfer must target data locations within a permissible locus of locations. For a hypothetical (and probably impractical) targeting scheme that transfers a separate address for each data bit, the permissible locus of locations would be all possible locations.

The transfer buffer 303 includes a data buffer 305 that has at least N bits for accumulating data for an upcoming transfer. The transfer buffer 303 also includes a target information buffer 307 for storing information about the data's targeted data location(s).

With reference to FIG. 3, operation of the data coalescing unit ill is now described over an example cycle of collecting data for a single transfer.

A coalescing controller 309 accepts from a path 209 information about data location(s) targeted by a packet comprising data. The coalescing controller examines the target information buffer 307 and determines that the data buffer 305 currently contains no valid data for an upcoming transfer (e.g., because a full transfer has just taken place). Based on its determination, the controller 309 directs a data positioner 311 to accept from a path 207 the packet's data and place the packet's data into the data buffer 305. The controller 309 also records target information regarding this packet's data into the target information buffer 307.

In this way, the data coalescing unit begins to accumulate data for an upcoming transfer. In the embodiment of the invention in which the packet comes from a queue 211 (shown in FIG. 2), the controller 309 removes the packet from the queue 211 after offloading the packets' data from the queue 211.

Subsequently, the coalescing controller 309 accepts from the path 209 information about data location(s) targeted by a new data packet. The controller 309 compares the new packet's target information to the existing target information in the target information buffer 309. The controller 309 determines based on the comparison whether the new packet's data can be added to the data buffer 305 without overwriting valid data in the data buffer 305 and without causing the upcoming data transfer to violate the transfer requirement that all data for a single transfer must target data locations within a permissible locus of locations.

In a preferred embodiment, the controller 309 also determines from the new packet's target information whether the packet's data targets addresses are cacheable addresses. The controller makes this determination by comparing the new packet's target information with boundary addresses of addresses known to be cacheable. Data that target cacheable addresses are not added to the data buffer 305 which already contains valid data.

If the controller 309 determines that the new packet's data can properly be added to the data buffer 305, the controller 309 directs the data positioner 311 to accept the new packet's data from the path 207 and place the packet's data into the data buffer 305. The controller 309 also amends the existing target information in the target information buffer 307 to include information regarding the new packet's targeted data location(s).

This process is repeated for additional data packets comprising data. In this way, data for an upcoming transfer on the data transfer path 109 accumulates, or "coalesces," in the data buffer 305.

If the controller 309 determines that a new packet's data cannot properly be added to the transfer buffer 303, then the controller 309 does not cause the data to be added, thereby stalling the new packet's data. When existing, coalesced data and target information in the transfer buffer 303 is offloaded from the transfer buffer 303 via the paths 313 and 315 for transfer on the data transfer path 109, portions of the transfer buffer 303 that held the transferred data no longer hold valid data and may be overwritten. At this time, the coalescing controller 309 again inspects data packets (including any previously stalled packet) to begin accumulating data for a next upcoming transfer on the data transfer path 109.

In some embodiments of the present invention, the paths 313 and 315 are simply paths 213 and 215 of the data path 109 itself.

Figure 4:
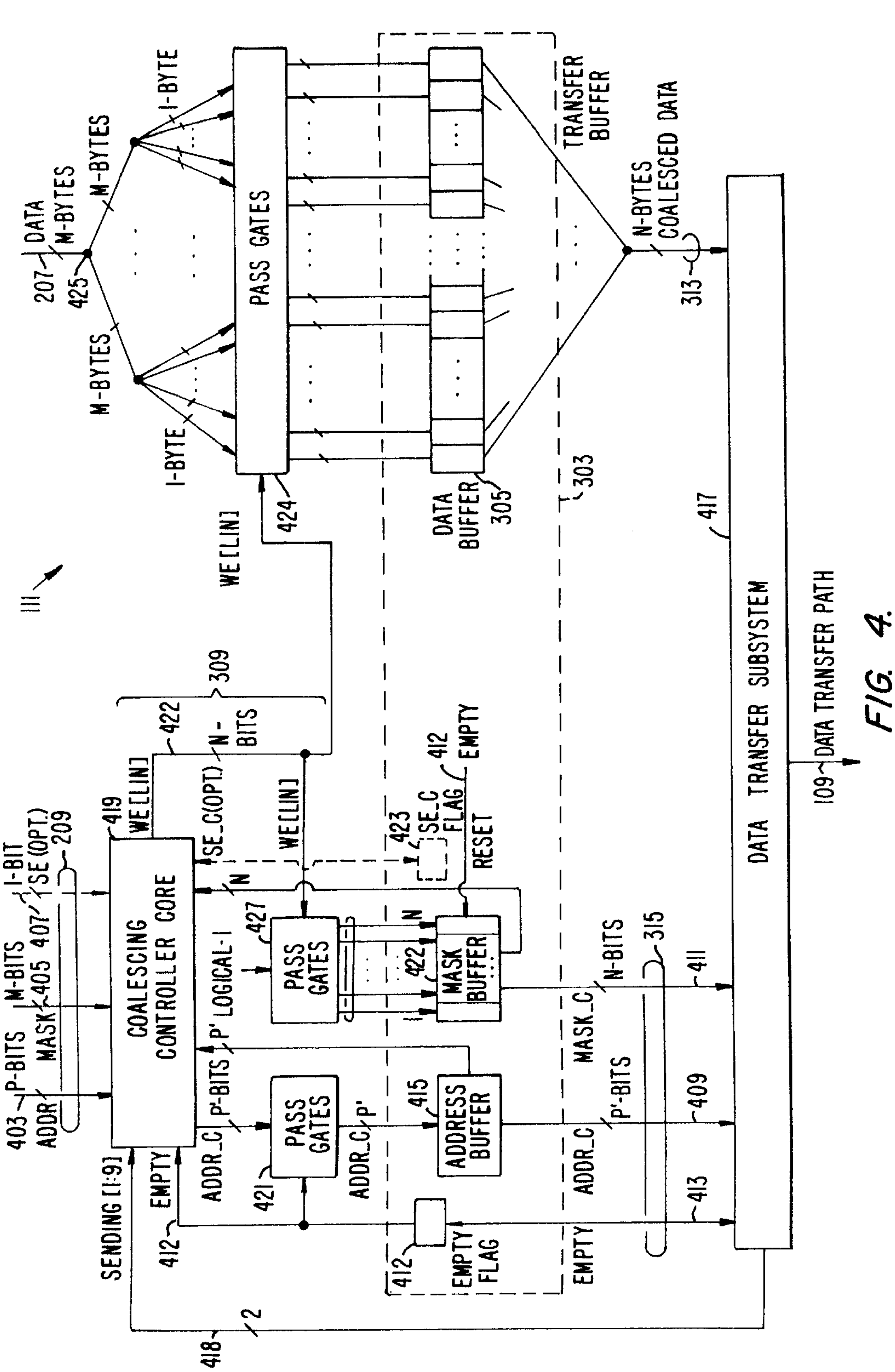
FIG. 4 is a schematic block diagram showing the data coalescing unit of FIG. 3 in more detail.

FIG. 4 is a schematic block diagram showing components within a data coalescing unit 111 of FIG. 3 in more detail. The data coalescing unit 111 has inputs, including a packet's data (via path 207), address indicator (ADDR, via path 403), mask (MASK, via path 405), and optional "not coalescible" flag (SE, via optional path 407) which is found in certain embodiments of the present invention.

The optional flag, SE, indicates that a particular packet should not be combined for transfer. The letters "SE" derive from the term "Side Effect," in recognition of the fact that certain data whose transfer to target location(s) produces side-effects should not be combined with other data for transfer.

Indicating Target Location(s) of a Packet's Data

In the embodiment of FIG. 4, an incoming packet's data are positioned in a field of m ordered bytes on the input path 207. The target locations of these data are indicated according to a targeting scheme, as discussed below.

In discussing targeting schemes, unless otherwise noted, zero-based addressing notation and one-based address indexing notation will be used. Under these notations, the smallest address is zero, and the earliest byte in a group of bytes is referred to as the first, not the zeroeth, byte. This choice of notations is made for clarity and convenience of expression. Other notations could have been chosen without affecting the described nature of the invention itself.

A packet's address indicator (ADDR) identifies the packet's starting target address. The starting target address is a byte address. Data positioned in the i'th byte of the packet's field of m bytes target the i'th data location byte as counted starting with the packet's identified starting target address. For example, if a packet's starting target address is 24 (i.e., binary 11000) and the first and second bytes of the packet's field of m bytes are to be transferred, then the field's first byte of data targets address 24 and the field's second byte of data targets address 25.

In some embodiments of the invention, a packet's address indicator ADDR is simply the packet's starting target address to be indicated. For example, if the packet's starting target address is byte 24 (binary 11000), then ADDR would be simply be 24 in these embodiments.

In other particular embodiments of the invention which will be discussed in detail, a packet's address indicator ADDR comprises only the highest bits of the packet's starting target address, with the omitted lower bits constrained to being zero. The number of omitted lower bits is $\log_2(m)$. For example, if m equals 8 (i.e., the packet can have up to 8 bytes of data), and the packet's starting target address is byte 24 (binary 11000), then ADDR is binary 11 (which is binary 11000 excluding its lowest $\log_2 8$ bits).

A packet's mask (MASK) contains m ordered bits, each corresponding to one of the bytes of data in the field of m bytes. The i'th bit of MASK indicates whether the i'th byte of the packet's field of m bytes actually contains data to be transferred. Examples 1 are provided below of addressing and byte-masking a packet's data according to the particular embodiments of the invention to be discussed in detail.

EXAMPLES 1

Target Information for a Packet's Data

The following are examples illustrating the use of a packet's address indicator and mask, in an embodiment according to FIG. 4 wherein m equals 8 (note that $\log_2 8$ equals 3):

To store a byte into byte-address 24 (binary 1,1000):

a) set ADDR to binary 11;

b) set MASK to the binary sequence 0000,0001 (MASK's "first" bit being written on the right); and c) place the byte of data into the first byte of the packet's field of m bytes.

To store a byte into byte-address 25 (binary 1,1001):

a) set ADDR to binary 11;

b) set MASK to the binary sequence 0000,0010; and c) place the byte of data into the second byte of the packet's field of m bytes.

To store a half word (2 bytes) starting at byte-address 28 (binary 1,1100):

a) set ADDR to binary 11;

b) set MASK to the binary sequence 0011,0000; and c) place the half word into the packet's field of m bytes starting at the fourth byte (and ending at the fifth byte).

The packet's address indicator ADDR and byte-mask MASK, as described above, provide one targeting scheme for packets. Other schemes for specifying target locations remain within the scope of the present invention.

Indicating Target Location(s) of Coalesced Data

The data coalescing unit 111 produces intermediate outputs on paths 313 and 315 for a transfer path 109 that has n bytes of width. These intermediate outputs of the data coalescing unit 111 include up to n bytes of coalesced data (via path 313), the coalesced data's address (ADDR_C, via path 409), the coalesced data's mask (MASK_C, via path 411), and a flag (EMPTY 412, via path 413) indicating whether there actually is coalesced data to be transferred.

The data coalescing unit 111 assembles the intermediate outputs in a transfer buffer 303. The manner of assembly will be described, but first the organization of the intermediate outputs is described for this embodiment.

Coalesced data are positioned in a field of n ordered bytes in a data buffer 305 within the transfer buffer 303. The coalesced data's address indicator (ADDR_C) is stored in an address buffer 415. ADDR_C identifies the starting target address of the coalesced data. Data positioned in the i'th byte of the coalesced data's field of n bytes target the i'th data location byte as counted starting from the coalesced data's starting target address (as identified by ADDR_C).

In a particular embodiment of the invention, ADDR_C comprises only the highest bits of the coalesced data's starting target address, with the omitted lower bits constrained to being zero. The number of omitted lower bits is $\log_2(n)$. For example, if n equals 16 (i.e., there can be up to 16 bytes of coalesced data), and the coalesced data's starting target address is byte 16 (binary 1,0000), then ADDR_C is binary 1 (which is binary 1,0000 excluding its lowest $\log_2 16$ bits).

The coalesced data's mask (MASK_C) contains n ordered bits, the i'th bit of which indicates whether the i'th byte of the coalesced data's field of n bytes actually contains data to be transferred. Example 2 is provided below of addressing and byte-masking of coalesced data in the intermediate output of FIG. 4, for the particular packets discussed in the previous Examples 1.

EXAMPLE 2

Target Information for Coalesced Data

The following is an example illustrating the use of ADDR _C and MASK_C for identifying target locations of coalesced data consisting of data from the packets in Examples 1, above, in a particular embodiment of the invention wherein n equals 16 (and m equals 8; note that $\log_2 16$ equals 4):

ADDR_C=1; (corresponding to starting address 16, which is binary 10000)

MASK_C=binary 0011,0011,0000,0000; and the field of n bytes of data contains the packets' data, coalesced, in the field's ninth, tenth, thirteenth, and fourteenth bytes.

The address indicator ADDR_C and byte-mask MASK_C, as described above, provide one targeting scheme for coalesced data. Other schemes for specifying target locations of coalesced data remain within the scope of the present invention.

In some embodiments of the present invention, a data transfer subsystem 417 converts the address indicator ADDR_C and byte-mask MASK_C into another targeting scheme for use on the data transfer path 109, as will be discussed in connection with FIG. 5. In other embodiments of the present invention, the data transfer subsystem 417 does no targeting scheme conversion but simply couples the paths 313 and 315 to be portions of the data transfer path 109 itself.

Assembly of Coalesced Data

It is assumed in the embodiment of FIG. 4 that n>m and that n is a multiple of m. Therefore, the n bytes of the data buffer 305 comprise q blocks of m bytes, wherein q equals n/m. Preferred embodiments of the present invention achieve greater generality and performance by requiring that n be an even multiple of m.

The data transfer subsystem sets flags SENDING[1:q] 418 when it transfers data along the data transfer path 109. Each flag SENDING[i] 418 indicates whether an all valid data is being offloaded from an i'th block of m bytes of the data buffer 305. SENDING[1:q] is useful because if a block of data is being offloaded, then that block may be thereafter be overwritten in the data buffer 305.

A coalescing controller core 419 within a coalescing controller 309 accepts target information ADDR, MASK, and SE of a packet. In specific embodiments of the present invention, ADDR, SE, and MASK are p, one, and m bits wide, respectively. The coalescing controller core 419 also receives as input the EMPTY flag 412 and the flags SENDING[1:q] 418.

Control logic, such as a pass gate 421, examines an EMPTY flag 412. Assume that the control logic determines therefrom that the data buffer 305 contains no valid data for an upcoming transfer (e.g., because a full transfer has just taken place). Based on this determination, the control logic (pass gate 421) in the specific embodiments sets ADDR_C for the coalesced data equal to the highest p' bits of ADDR, wherein p' is p minus $\log_2(m)$, and resets MASK_C in a mask buffer 422 to zero. A flag SE_C 423 in the transfer buffer is set to have the value of the packet's SE flag.

Based on coalescing logic which will be described later, the controller core 419 produces write enable signals 422 that direct a data positioner 311 to place a packet's data into proper positions within the data buffer 305. In the specific embodiment of the present invention shown, the write enable signals 422 are implemented as n bits (WE[1:n]), each controlling the placing by pass gates 424 of one byte of data into a particular byte position in the data buffer 305.

The n byte positions of the data buffer 305 are made up of q (=n/m) blocks of m bytes. Each block of m bytes is aligned to receive data via the pass gates 424 from the m bytes of the packet's data field. In FIG. 4, this alignment is achieved by splitting the packet's data into multiple copies at a node 425 and feeding the full n bytes of data, including duplicates, to n bytes of pass gates 424.

The pass gates 424 actually need only receive active copies of the packet's data at those byte positions i enabled by an active WE[i]. Therefore, certain embodiments of the present invention replace the node 425, or the node 425 plus the pass gates 424, with multiplexor circuits controlled by the write enable signals 422 to achieve the same logical result.

The write enable signals 422 also write logical ones into those bits of MASK_C corresponding to those bytes of the data buffer 305 receiving data for transfer. In the specific embodiment of the present invention shown, the write enable signals WE[1:n] control pass gates 427 to achieve this writing of logical ones. In the sense that pass gates 427 place copies of MASK into MASK_C, the pass gates 427 may also be termed a mask positioner.

Coalescing Control Logic

The write enable signals WE[1:n] indicate whether to combine a packet's data with existing coalescing data and also where in the n bytes of data buffer 305 to put a packet's data if it is to be combined.

The formula for determining a particular k'th one of the q m-bytes-long blocks of the data buffer 305 to which to map the packet's m-bytes-long data field is as follows. (k is a one-based index, in keeping with the chosen notational convention.)

$$k = ADDR[\text{lowest}(p-p')\text{bits}]+1 \quad (1)$$

The logic implemented in the coalescing controller core 419 for setting WE[1:n] is summarized in the following pseudo-code. In the following pseudo-code, "|" is the C language's bitwise-OR operator; "&" is C's bitwise-AND operator; and zero evaluates as logical FALSE while a nonzero value evaluates as logical TRUE.

Pseudo-Code Showing Coalescing Logic and Data Positioning

```
1) MERGE = TRUE;
2) k = ADDR[lowest (p - p') bits] + 1;
3) if     ((ADDR[top p' bits] != ADDR_C[top p' bits]) and
           (not EMPTY) and
           (not SENDING-so-as-to-leave-data-buffer-empty))
          MERGE = FALSE;
4) if     ((SE | SE_C) and
           (not EMPTY) and
           (not SENDING-so-as-to-leave-data-buffer-empty))
          MERGE = FALSE;
5) if     ((MASK[all m bytes] &
            MASK_C[the m corresponding bytes])
           and
           (not EMPTY) and
           (not SENDING-to-leave-corresponding-buffer-bytes-
            empty))
       MERGE = FALSE;
6) WE[all n bytes] =
       MERGE & n-bytes-of-zero-with-k'th-block-set-to-MASK;
```

Step 1 of the pseudo-code initializes the MERGE flag.

Step 2 calculates k, wherein the k'th m-byte-long block of the data buffer corresponds to the target address of the packet, assuming that the packet can be merged with existing data in the data buffer 305.

Step 3 determines whether the packet targets locations outside of the permissible locus of locations for the coalescing data in the data buffer 305.

Step 4 inhibits merging if the SE flag for the packet or for the data currently in the data buffer 305 is set.

Step 5 determines whether merging the packet's data would overwrite existing valid data in the data buffer 305.

Step 6 sets the bits to control placement of the packet's data into the data buffer.

Conversion to Transfer Data Path's Targeting Scheme

Figure 5:
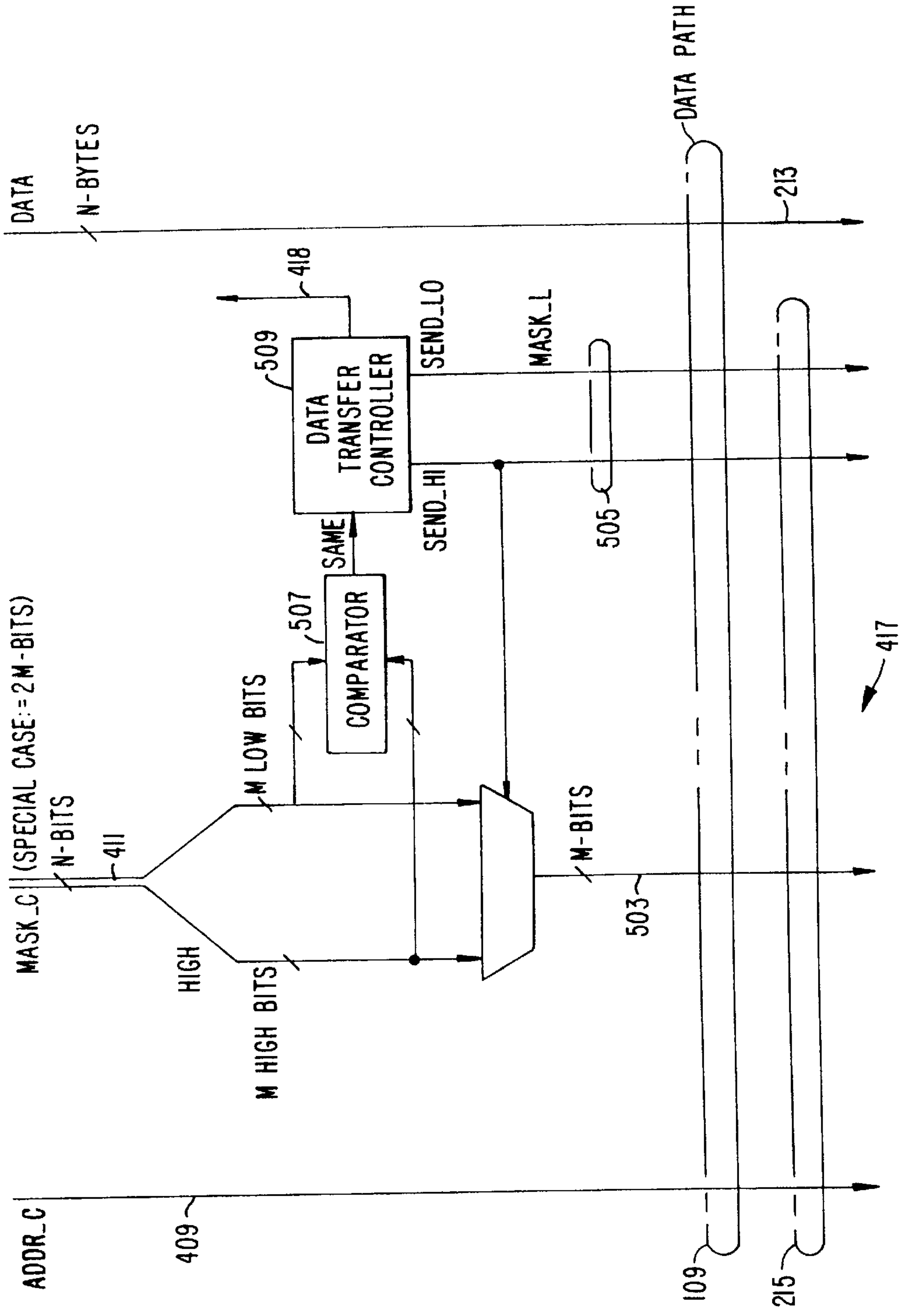
FIG. 5 is a schematic block diagram showing a data transfer subsystem of FIG. 4 according to an embodiment of the present invention.

FIG. 5 is a schematic block diagram showing a data transfer subsystem of FIG. 4 according to an embodiment of the present invention. The transfer subsystem 417 converts the address indicator ADDR_C and byte-mask MASK_C of FIG. 4 into a targeting scheme for use on the data transfer path 109, hereinafter referred to as the transfer targeting scheme.

In FIG. 5, n is shown as being equal to 2 m, for ease of illustration. For example, the transfer targeting scheme may allow up to 16 bytes of data per transfer while each packet may contain up to 8 bytes of data.

The transfer targeting scheme uses ADDR_C as the coalesced data's starting target address, as does the targeting scheme used within the transfer buffer 303, described above. However, the transfer targeting scheme does not use MASK_C, the n-bits-long byte-mask, to indicate which portions of the n possible bytes of coalesced data actually contain coalesced data to be transferred. Instead, the transfer targeting scheme uses a combination of an m-bits-long byte-mask (MASK_T) on a path 503 plus a q-bits-long "block-mask" (MASK_L) on a path 505. (The letter T in "MASK_T" refers to "Transfer", and the letter L in "MASK_L" refers to "bLock".)

MASK_T is a byte-mask applicable to a particular block of m bytes within the n possible bytes of coalesced data. MASK_L is a q-bits-long block-mask, the k'th bit of which indicates whether MASK_T should be applied to the k'th block of m bytes within the n possible bytes of coalesced data. In short, of the n possible bytes of coalesced data (organized into q blocks of m bytes each), an i'th byte within a k'th block contains data to be transferred if and only if the i'th bit of MASK_T and the k'th bit of MASK_L are on.

As can be seen, using MASK_T plus MASK_L reduces the total number of required mask bits, as compared to using MASK_C. This reduction in the number of mask bits comes at the expense of having no freedom to have different byte-masks in different blocks of the q m-bytes-long blocks. In embodiments of the present invention in which the formats of data to be transferred tend to be regular, the loss of freedom does not present a very large problem, and it is particularly worthwhile to use MASK_T plus MASK_L instead of MASK_C. An example of such an embodiment is one in which the data path is coupled to transfer data to a graphics frame buffer.

In FIG. 5, MASK_C comprises a high section of m bits and a low section of m bits. A comparator 507 compares the two sections to determine if they are identical. If so, a data transfer controller 509 turns on both bits of MASK_L on path 505 so as to transfer data from both blocks of coalesced data. If not, the data transfer controller 509 turns on only one bit of MASK_L so as to transfer one block, leaving the other block to be transferred in a later transfer cycle, preferably the next transfer cycle.

As noted earlier, FIG. 5 shows an embodiment in which there are exactly two m-bytes-long blocks within the n possible bytes of coalesced data (i.e., n=2 m). Other embodiments of the present invention do not require that n=2 m. In these other embodiments, a comparator 507 compares all q (=n/m; q>2) sections of m bits within MASK_C; a data transfer controller 509 sets up to q bits of MASK_L; and more than a single later transfer cycle may be required for transferring blocks which could not be transferred due a mismatch between their m-bits-long byte-mask sections and the m-bits-long byte-mask section of the block(s) being sent.

While the above is a complete description of specific embodiments of the invention, various modifications, alternative constructions, and equivalents may be used. Therefore, the above description should not be taken as limiting the scope of the invention as defined by the claims.

What is claimed is:

1. A method for simultaneously transferring data from a plurality of data packets via a data path utilizing a transfer buffer including a target information buffer for specifying targets within a locus of permissible locations, a mask information buffer, and a data buffer, wherein each of the plurality of data packets includes multi-byte packet data, mask information indicating which bytes multi-byte packet data contain valid data, and target information, the method comprising the steps of:

initializing the target information buffer using target information from a first data packet of the plurality of data packets to define a locus of permissible target locations;

initializing the mask information buffer using mask information from a first data packet of the plurality of data packets to indicate locations in the data buffer storing valid data;

storing only packet data from the first data packet within the data buffer;

utilizing target information stored in the target buffer and target information from a next data packet in the plurality of data packets to indicate whether target data from the next packet targets a location within the locus of permissible locations and can be coalesced in the data buffer with packet data from the first data packet;

utilizing mask information stored in said mask information buffer and mask information from a next packet in the plurality of data packets to assert a write enable signal indicating that packet data from the next data packet would not overwrite valid packet data stored in the data buffer and in response to an indication that data from the next packet is within the locus of permissible locations;

storing only packet data from the next data packet within the data buffer in response to assertion of the write enable signal; and transferring the stored, coalesced, packet data from the data buffer as a group onto the data path.

2. The method as set forth in claim 1, wherein the mask information buffer includes a coalesced data mask and the target information buffer stores a coalesced data address, and further wherein the target information of each of the plurality of data packets includes a packet mask and a packet address, the step of initializing the target information buffer comprising the steps of:

resolving the coalesced data address utilizing a packet address of the first data packet;

generating a data block index of the first data packet, designating a location within the data buffer where the packet data from the first data packet will be stored, utilizing the coalesced data address and the packet address of the first data packet; and revising the coalesced data mask utilizing the data block index of the first data packet and a packet mask of the first data packet.

3. The method as set forth in claim 2, wherein the step of storing packet data from the first data packet within the data buffer comprises the step of storing packet data from the first data packet within the data buffer utilizing the data block index of the first data packet and the packet mask of the first data packet.

4. The method as set forth in claim 2, wherein the step of determining whether a next data packet from the plurality of data packets can be coalesced comprises the steps of:

generating a data block index of the next data packet utilizing the coalesced data address and a packet address of the next data packet;

comparing a portion of the coalesced data address and a portion of the packet address of the next data packet to determine whether the data block index of the next data packet corresponds to a location within the data buffer; and comparing a portion of the coalesced data mask to a packet mask of the next data packet to determine whether packet data from the next data packet will overwrite previously stored packet data within the data buffer.

5. The method as set forth in claim 4, wherein the step of storing packet data from the next data packet within the data buffer in response to a determination that the next data packet can be coalesced comprises the step of storing packet data from the next data packet within the data buffer in response to a determination that the data block index of the next data packet corresponds to a location within the data buffer.

6. A system for coalescing data from a plurality of data packets for group transfer via a data path wherein each of the plurality of data packets includes packet data, mask information indicating which bytes of multi-byte packet data contain valid data, and target information, said system comprising:

a transfer buffer configured to store packet data from a plurality of data packets and coalesced data target information and to transfer stored packet data as a group onto the data path utilizing the coalesced data target information;

a target information buffer holding coalesced data target information capable of specifying targets within a locus of permissible locations;

a mask information buffer storing coalesced mask information indicating valid data location of data previously coalesced in the data buffer;

a controller, coupled to the data buffer, target information buffer, and mask information buffer, configured to accept target information from a given data packet, for utilizing coalesced target information stored in the target buffer and target information from a next data packet in the plurality of data packets to indicate whether data from the next packet targets a location within the locus of permissible locations and can be coalesced in the data buffer with packet data from a first data packet and utilizing mask information stored in said mask information buffer and mask information from a next packet in the plurality of data packets to assert a write enable signal indicating that packet data from the next data packet would not overwrite valid coalesced packet data stored in the data buffer and in response to an indication that data from the next packet is within the locus of permissible locations;

a data positioner, coupled to said data buffer, configured to transfer packet data from the given data packet to the transfer buffer in response to the write enable signals.

* * * * *